(12) United States Patent
Hanzawa

(10) Patent No.: US 11,175,510 B2
(45) Date of Patent: Nov. 16, 2021

(54) IMAGE PROJECTION SYSTEM

(71) Applicant: SONY SEMICONDUCTOR SOLUTIONS CORPORATION, Kanagawa (JP)

(72) Inventor: Fumihiko Hanzawa, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/758,388

(22) PCT Filed: Oct. 4, 2018

(86) PCT No.: PCT/JP2018/037173
§ 371 (c)(1),
(2) Date: Apr. 22, 2020

(87) PCT Pub. No.: WO2019/087670
PCT Pub. Date: May 9, 2019

(65) Prior Publication Data
US 2020/0341276 A1     Oct. 29, 2020

(30) Foreign Application Priority Data
Nov. 2, 2017  (JP) .............................. JP2017-212859

(51) Int. Cl.
*G02B 27/01* (2006.01)
*G02B 5/32* (2006.01)
*G03H 1/02* (2006.01)

(52) U.S. Cl.
CPC ........... *G02B 27/0172* (2013.01); *G02B 5/32* (2013.01); *G03H 1/0248* (2013.01); *G02B 2027/0118* (2013.01); *G02B 2027/0174* (2013.01)

(58) Field of Classification Search
None
See application file for complete search history.

(56) References Cited

U.S. PATENT DOCUMENTS 8,885,112 B2 * 11/2014 Popovich ................. G02B 5/32
349/11
10,598,937 B2 * 3/2020 Amitai ................ G02B 5/3058
(Continued)

FOREIGN PATENT DOCUMENTS

CN          105929536 A     9/2016
EP          3062139 A1      8/2006
(Continued)

OTHER PUBLICATIONS

International Search Report and Written Opinion of PCT Application No. PCT/JP2018/037173, dated Dec. 4, 2018, 08 pages of ISRWO.

(Continued)

*Primary Examiner* — Jennifer D. Carruth
(74) *Attorney, Agent, or Firm* — Chip Law Group

(57) ABSTRACT

An image projection system according to the present disclosure includes a projection optical system and an eyepiece optical system. The projection optical system projects an image. The eyepiece optical system is configured separately from the projection optical system and is to be mounted on a head of a viewer. The eyepiece optical system includes at least one holographic element. The eyepiece optical system guides projection light from the projection optical system to a pupil of the viewer. The holographic element deflects first-order diffracted light toward the pupil of the viewer, and has a positive focal length for the first-order diffracted light. At a time of viewing of the image, the projection light enters the eyepiece optical system at an angle that is equal to or larger than θ expressed by the following expression, (Continued)

$\theta = \arctan((3.5+M)/f)$ where a focal length of the eyepiece optical system for the projection light is "f" [mm], and a maximum effective radius in an upper-lower direction with respect to the pupil of the viewer for the first-order diffracted light of the holographic element is "M" [mm].

7 Claims, 9 Drawing Sheets

(56) References Cited

U.S. PATENT DOCUMENTS

| | | |
|---|---|---|
| 2005/0206985 A1 | 9/2005 | Togino |
| 2006/0268421 A1 | 11/2006 | Shimizu et al. |
| 2007/0291355 A1 | 12/2007 | Tanijiri |
| 2010/0284070 A1 | 11/2010 | Shimizu et al. |
| 2015/0160529 A1* | 6/2015 | Popovich ............ G02F 1/13342 359/200.8 |
| 2016/0202485 A1 | 7/2016 | Yamada |
| 2016/0252726 A1 | 9/2016 | Ishida |
| 2017/0205630 A1 | 7/2017 | Tremblay et al. |

FOREIGN PATENT DOCUMENTS

| | | |
|---|---|---|
| JP | 11-190968 A | 7/1999 |
| JP | 2004-102204 A | 4/2004 |
| JP | 2006-053321 A | 2/2006 |
| JP | 2006-098820 A | 4/2006 |
| JP | 2007-333952 A | 12/2007 |
| JP | 5237267 B2 | 7/2013 |
| JP | 2016-128861 A | 7/2016 |
| JP | 2016-161670 A | 9/2016 |
| JP | 2017-212859 A | 11/2017 |
| KR | 2016-01-05325 A | 9/2016 |
| TW | 201708884 A | 3/2017 |

OTHER PUBLICATIONS

Ando, et al., "Head-mounted display using holographic optical element", Proceedings Three-Dimensional Video and Display: Devices and Systems: A Critical Review, vol. 10298, XP060094504, Feb. 28, 2001, 29 pages.

Extended European Search Report of EP Application No. 18872308.4 dated Nov. 11, 2020, 07 pages.

* cited by examiner

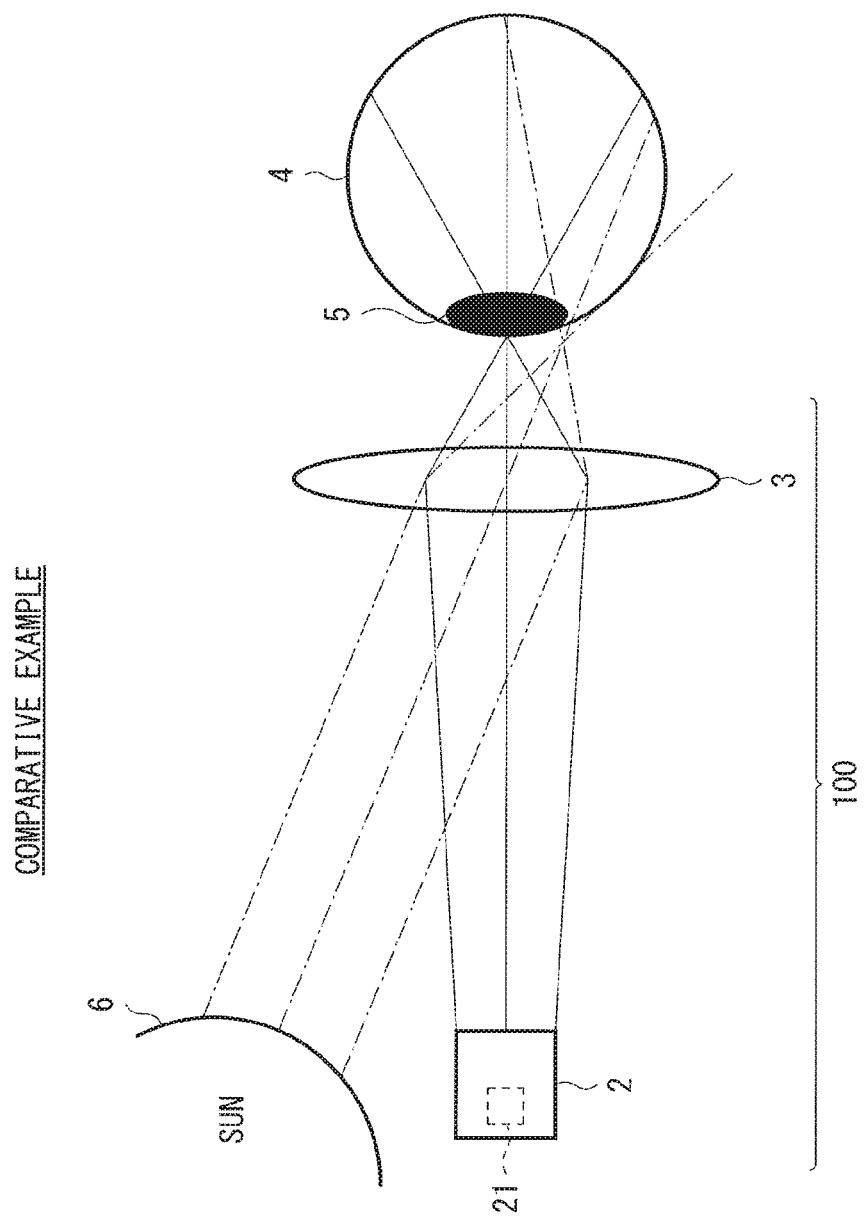
[FIG. 1]

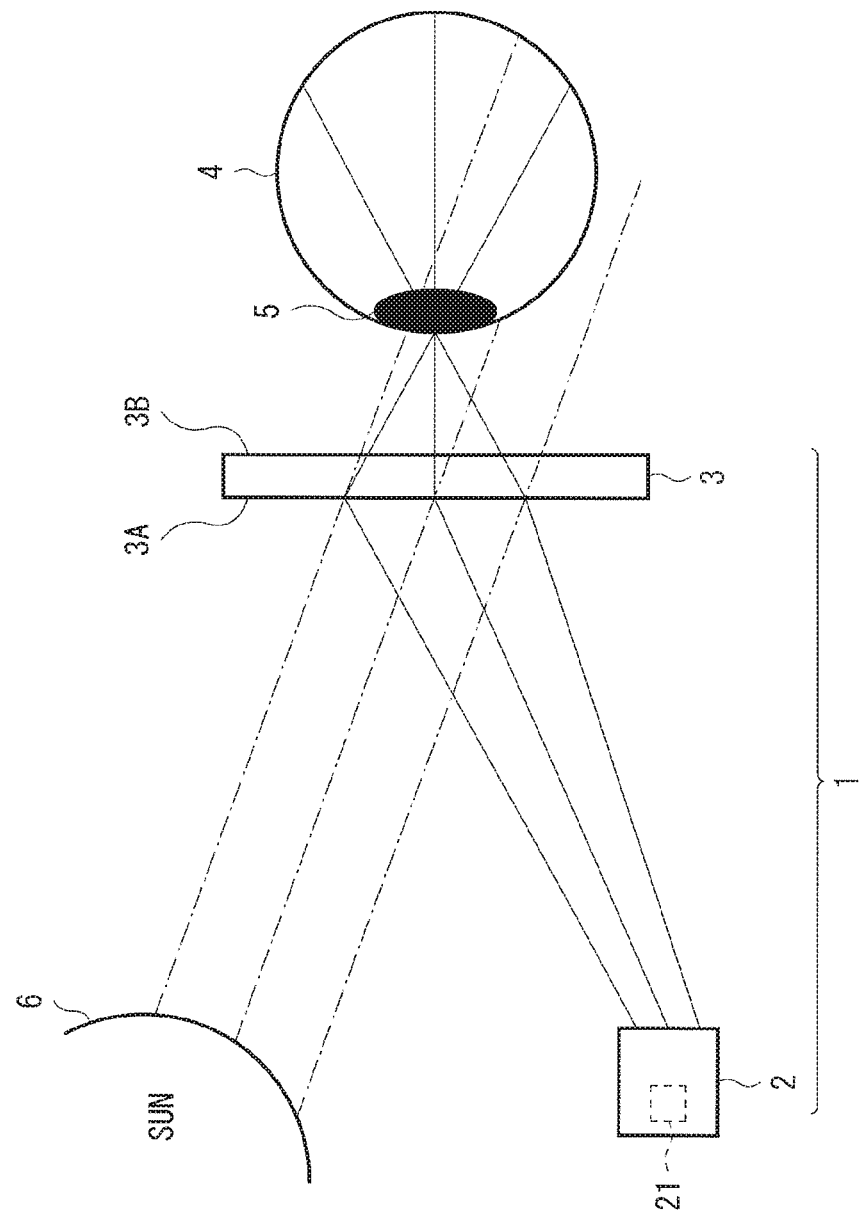
[FIG. 2]

[FIG. 3]
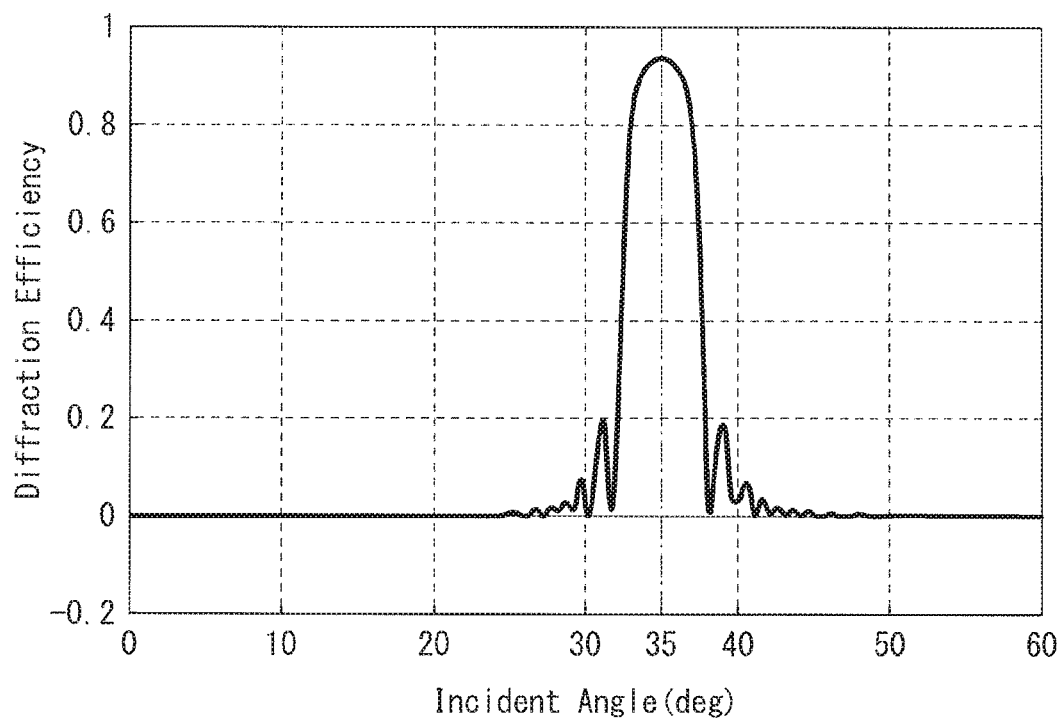

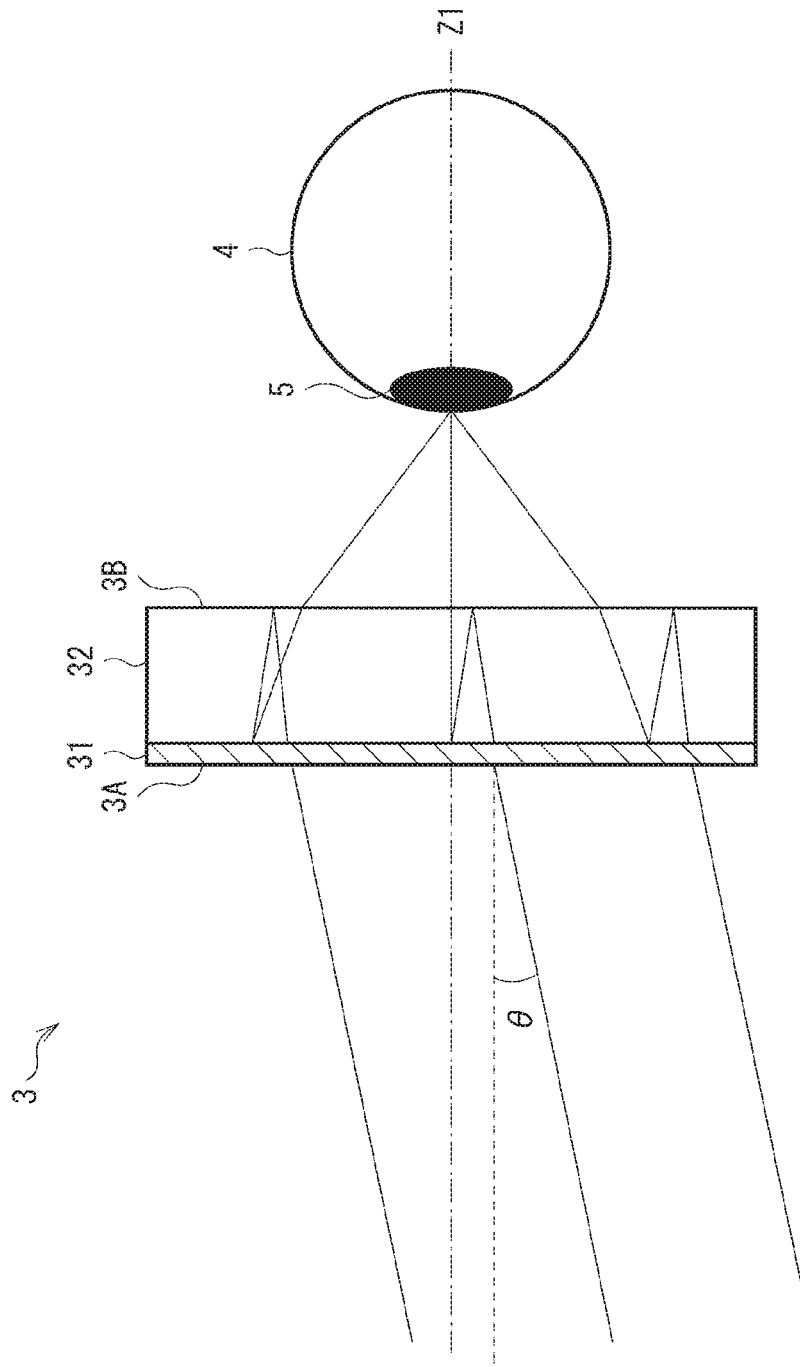
[FIG. 4]

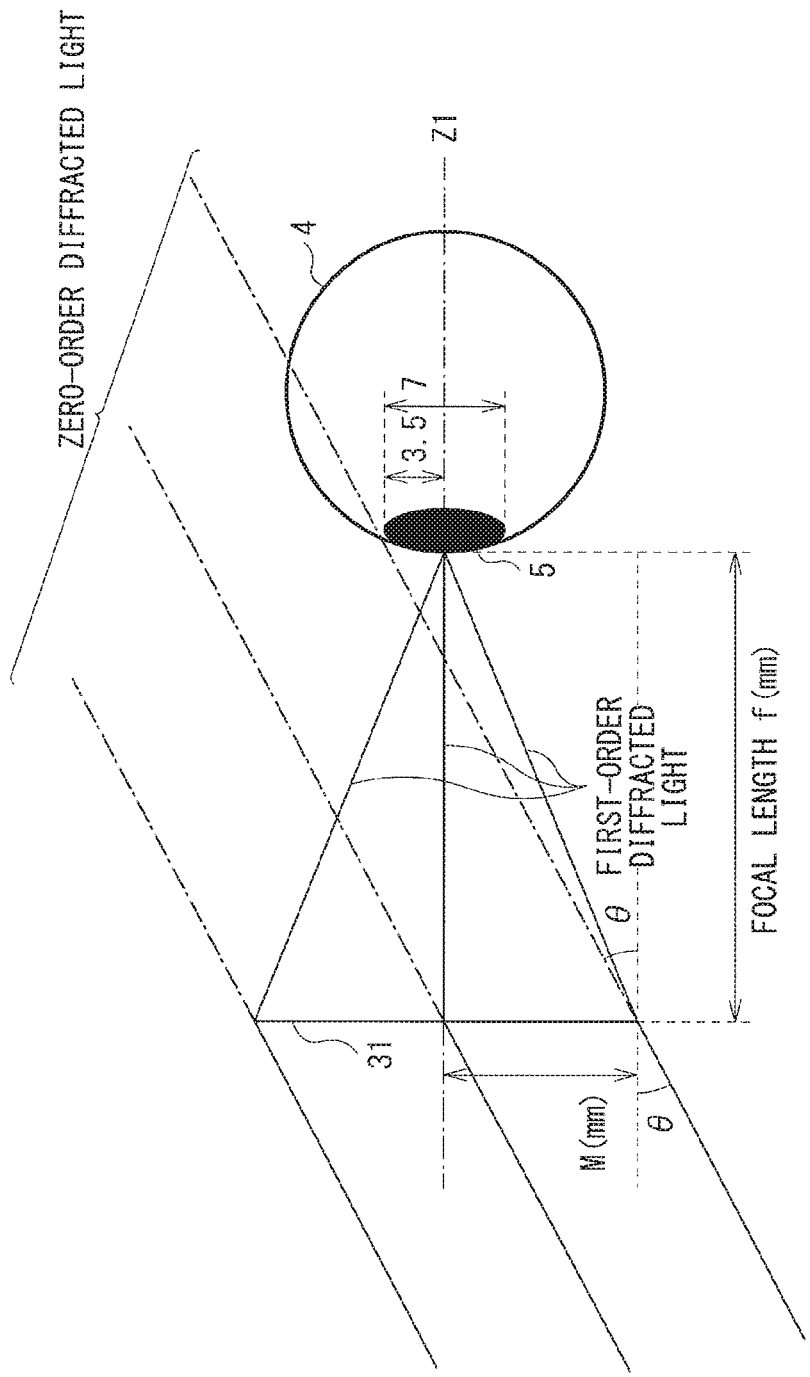
[FIG. 5]

[FIG. 6]
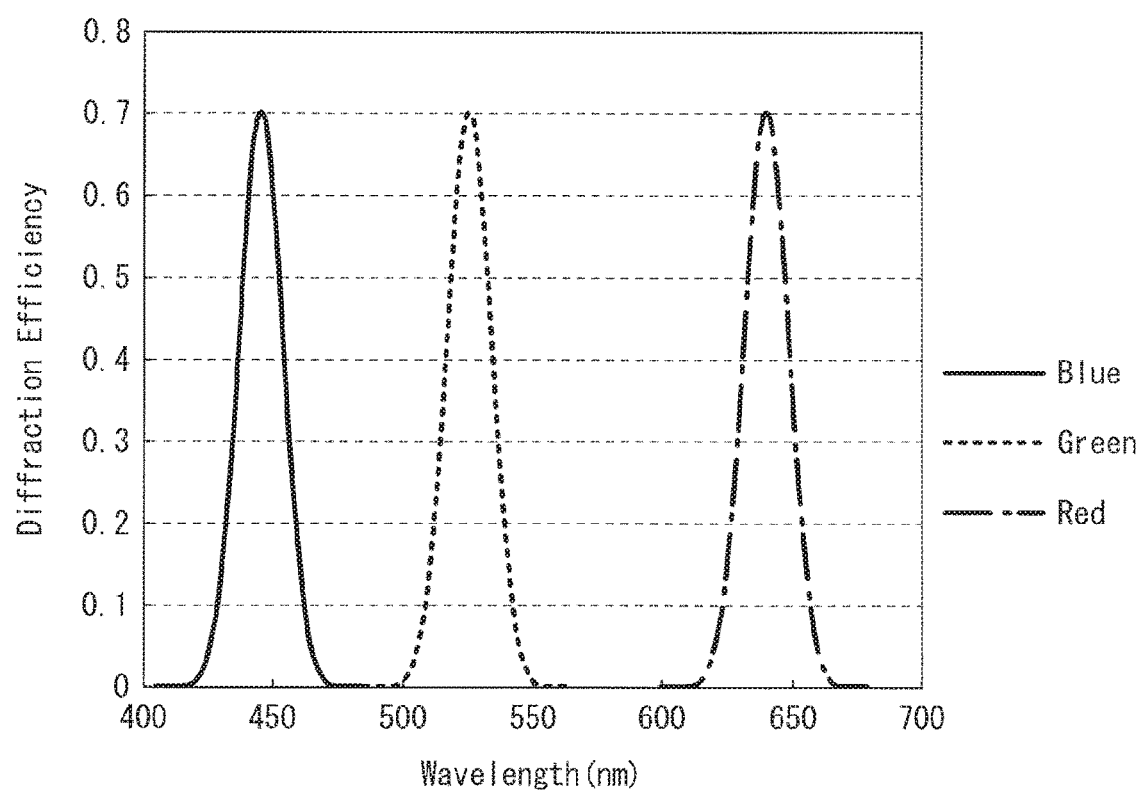

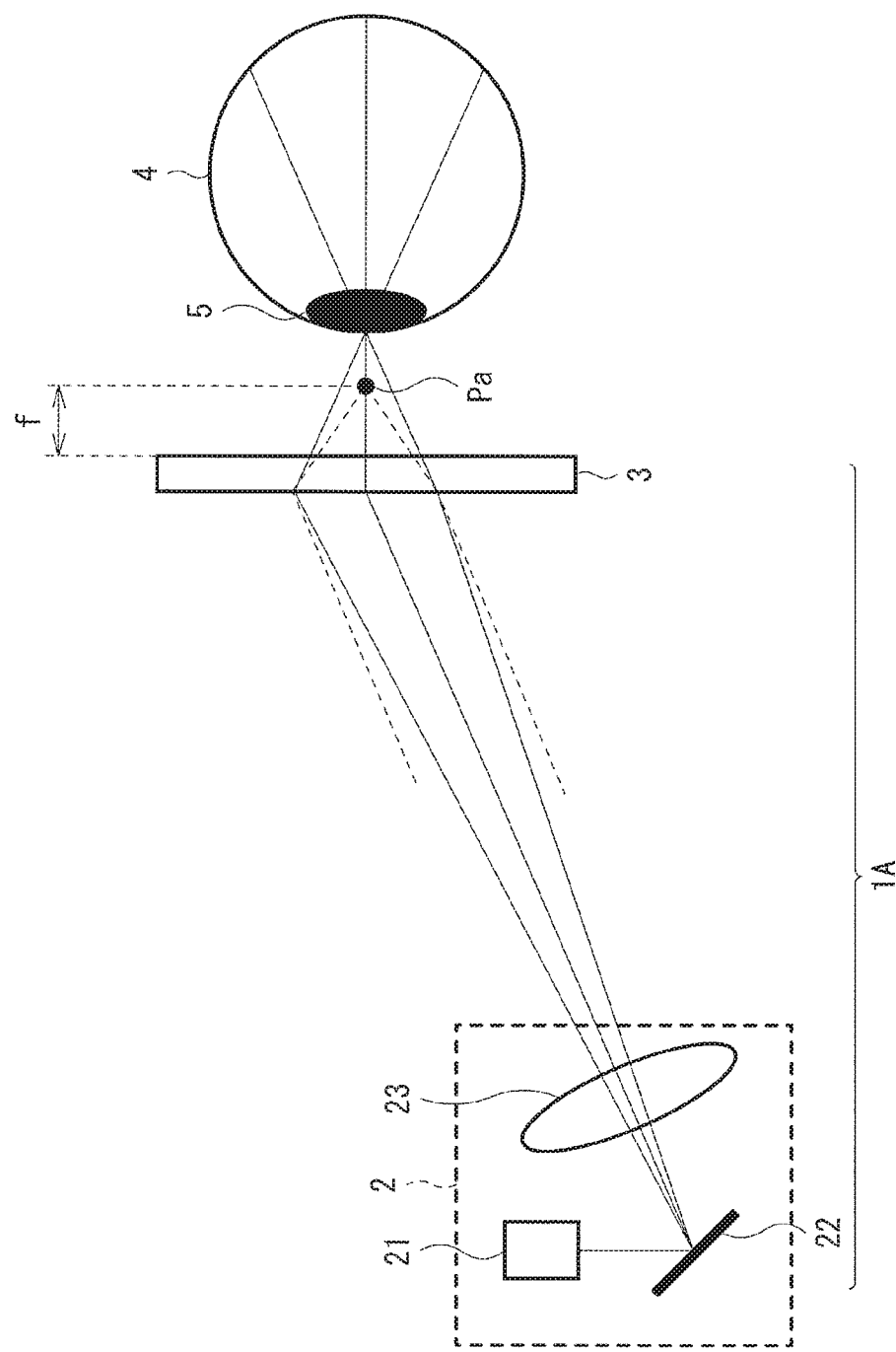
[FIG. 7]

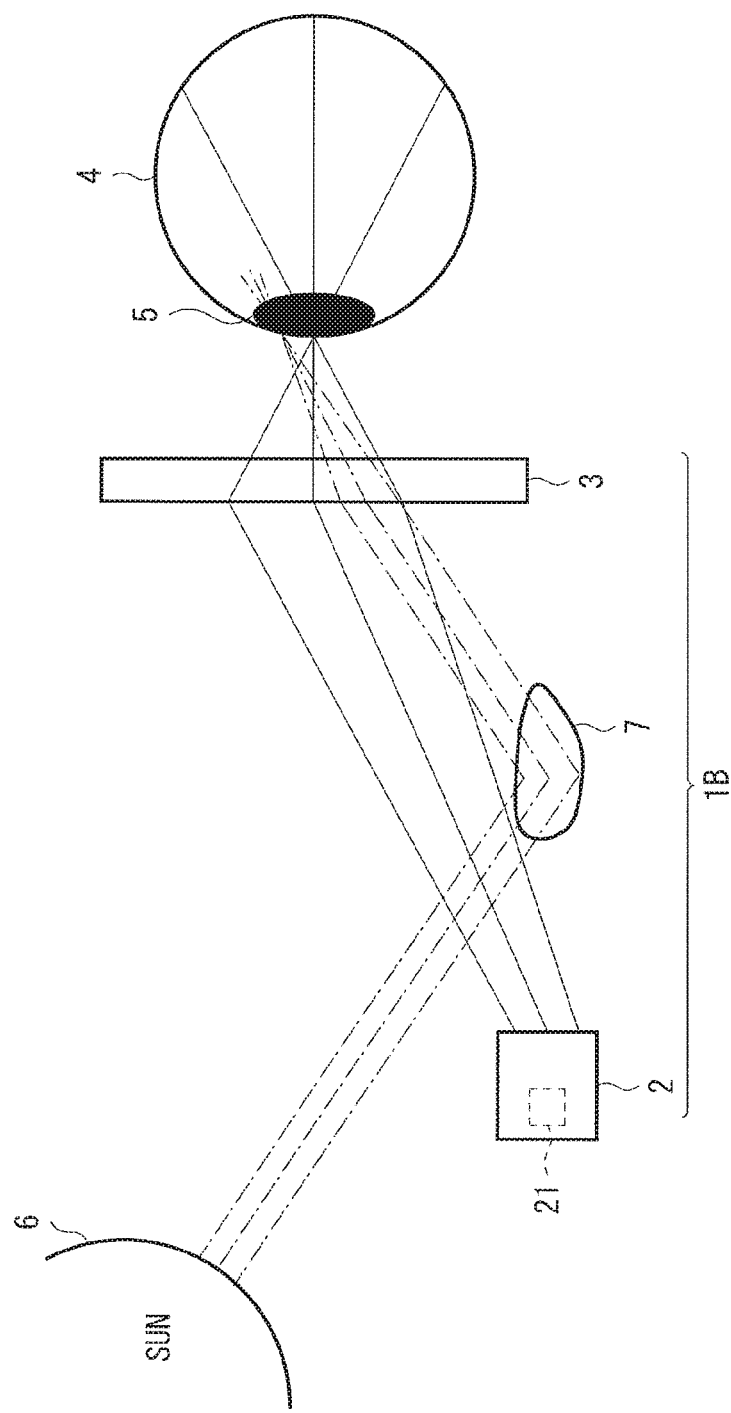
[FIG. 8]

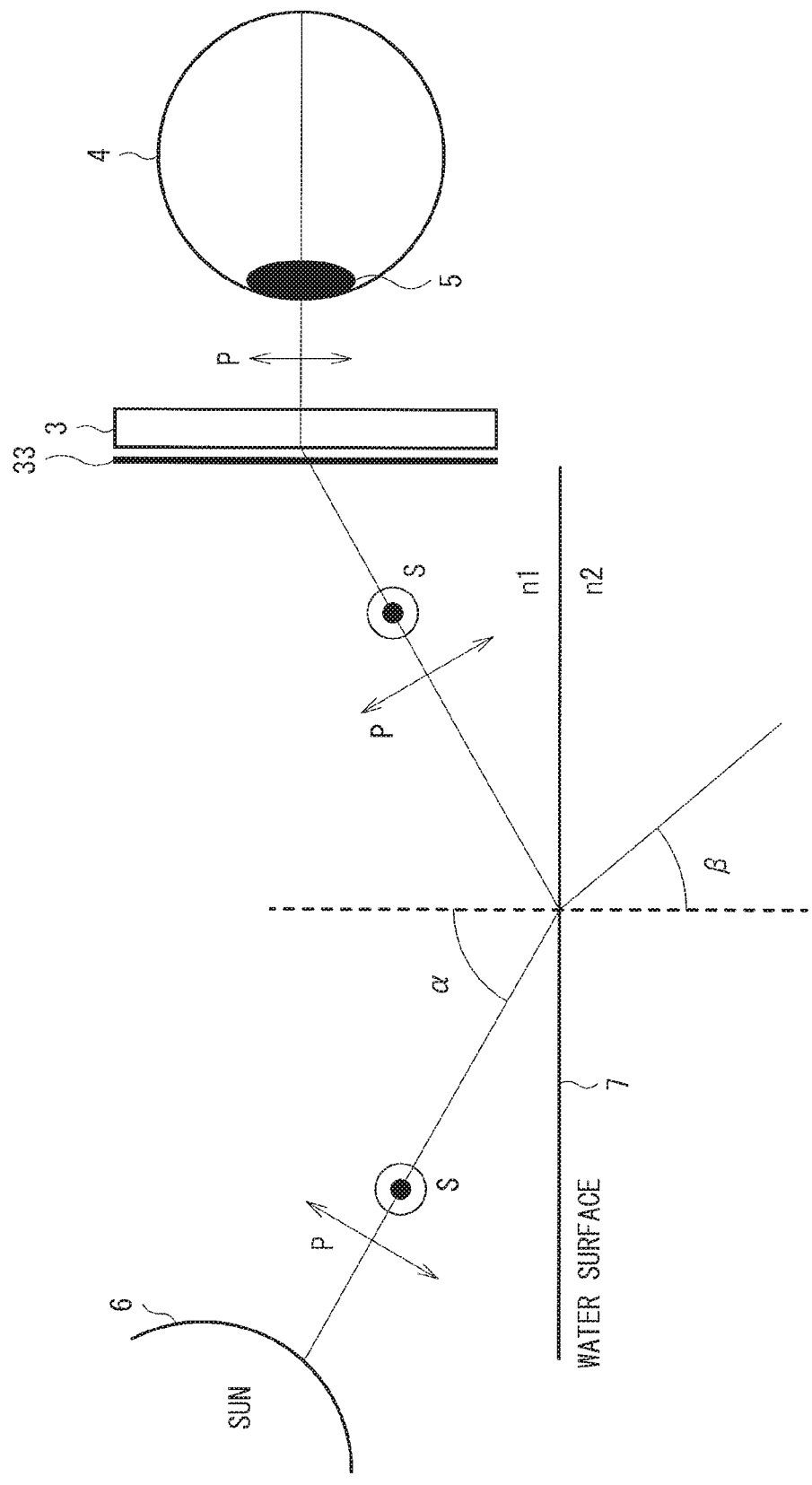
[FIG. 9]

IMAGE PROJECTION SYSTEM

CROSS REFERENCE TO RELATED APPLICATIONS

This application is a U.S. National Phase of International Patent Application No. PCT/JP2018/037173 filed on Oct. 4, 2018, which claims priority benefit of Japanese Patent Application No. JP 2017-212859 filed in the Japan Patent Office on Nov. 2, 2017. Each of the above-referenced applications is hereby incorporated herein by reference in its entirety.

TECHNICAL FIELD

The present disclosure relates to an image projection system that guides projection light from a projection optical system to a pupil of a viewer by means of an eyepiece optical system.

BACKGROUND ART

There is a head mount type display (HMD: Head Mount Display) to be mounted on a head of a viewer. An HMD has also been developed that allows for viewing while superimposing an image on scenery of an outside world in a see-through manner.

CITATION LIST

Patent Literature

PTL 1: Japanese Unexamined Patent Application Publication No. 2006-98820
PTL 2: Japanese Patent No. 5237267

SUMMARY OF THE INVENTION

In a case of an HMD that allows for viewing in a see-through manner as described above, unwanted light from an outside world can lead to degradation of image quality.

It is desirable to provide an image projection system that makes it possible to reduce unwanted light and improve image quality.

An image projection system according to one embodiment of the present disclosure includes a projection optical system and an eyepiece optical system. The projection optical system projects an image. The eyepiece optical system is configured separately from the projection optical system and is to be mounted on a head of a viewer. The eyepiece optical system includes at least one holographic element. The eyepiece optical system guides projection light from the projection optical system to a pupil of the viewer. The holographic element deflects first-order diffracted light toward the pupil of the viewer, and has a positive focal length for the first-order diffracted light. At a time of viewing of the image, the projection light enters the eyepiece optical system at an angle that is equal to or larger than $\theta$ expressed by the following expression, $$\theta = \arctan((3.5+M)/f)$$

where a focal length of the eyepiece optical system for the projection light is "f" [mm], and a maximum effective radius in an upper-lower direction with respect to the pupil of the viewer for the first-order diffracted light of the holographic element is "M" [mm].

In the image projection system according to the embodiment of the present disclosure, the projection light enters the eyepiece optical system at an appropriate angle.

According to the image projection system according to the embodiment of the present disclosure, a configuration of the projection optical system and a configuration of the eyepiece optical system are so optimized as to cause the projection light to enter the eyepiece optical system at an appropriate angle. It is therefore possible to reduce the unwanted light and improve the image quality.

It is to be noted that effects described here are not necessarily limiting, and any effect described in the present disclosure may be provided.

BRIEF DESCRIPTION OF THE DRAWINGS

FIG. 1 is a configuration diagram illustrating an outline of an image projection system according to a comparative example.
FIG. 2 is a configuration diagram illustrating an outline of an image projection system according to a first embodiment of the present disclosure.
FIG. 3 is a characteristic diagram illustrating angle dependency of diffraction efficiency of a volume-type HOE element of a reflection type.
FIG. 4 is an explanatory diagram illustrating an example of optical disposition of an HOE element in an eyepiece optical system of the image projection system according to the first embodiment and an action on an entering light beam in the eyepiece optical system.
FIG. 5 is an explanatory diagram illustrating a relationship of zero-order diffracted light and first-order diffracted light in the eyepiece optical system of the image projection system according to the first embodiment with respect to a pupil.
FIG. 6 is a characteristic diagram illustrating wavelength dependency of diffraction efficiency of an HOE element in an image projection system according to a second embodiment.
FIG. 7 is a configuration diagram illustrating an outline of an image projection system according to a third embodiment.
FIG. 8 is a configuration diagram illustrating an outline of an image projection system according to a fourth embodiment.
FIG. 9 is a configuration diagram illustrating an example of an eyepiece optical system in the image projection system according to the fourth embodiment.

MODES FOR CARRYING OUT THE INVENTION

In the following, some embodiments of the present disclosure are described in detail with reference to the drawings. It is to be noted that description is given in the following order.
0. Overview and Issues of Image Projection System
1. First Embodiment (FIG. 1 to FIG. 5)
   1.1 Overview
   1.2 Specific Examples
   1.3 Effects
2. Second Embodiment (FIG. 6)
   2.1 Overview
   2.2 Specific Examples
3. Third Embodiment (FIG. 7)
   3.1 Overview
   3.2 Specific Examples 4. Fourth Embodiment (FIG. 8 and FIG. 9)
  4.1 Overview
  4.2 Specific Examples
5. Other Embodiments

0. Overview and Issues of Image Projection System

The present disclosure relates to an HMD that allows for viewing while superimposing an image on scenery of an outside world in a see-through manner.

As a configuration of an HMD, there has been often proposed a type having an image display panel and an optical system that are built-in in a head mount unit. The optical system is directed to guiding of an image to a retina. Many of HMDs of this type are configured to guide the image to a retina of a viewer through the optical system in the head mount unit, and have such a configuration in which an image projection unit directed to viewing a virtual image and an eyepiece optical unit are integrally disposed in front of a pupil. The HMD of this type has an image panel, various types of optical elements, and a mechanism unit directed to retaining them in the head mount unit. Consequently, there is a disadvantage that weight of the HMD as a whole becomes heavy, which leads to fatigue when the HMD is worn for a long period of time.

To solve the disadvantage described above, PTL 1 (Japanese Unexamined Patent Application Publication No. 2006-98820), for example, proposes a display of a retina drawing type that is a separation optical system in which a projection optical system and an eyepiece optical system are separated. Separation of the projection optical system and the eyepiece optical system allows for notable reduction in size and weight of a unit to be mounted on a viewer's head. A holographic optical element (HOE element: Holographic Optical Element) is used in many of such HMDs having the configuration of the separation optical system. In light components outputted from the HOE element are present a light component of entering light that is deflected by diffraction and zero-order light component of the entering light that travels straight to be transmitted. When an angle of the light entering the HOE element is small, the zero-order light component travels straight to be transmitted and enters an eyeball, becoming unwanted noise light. This causes a notable degradation of image quality.

In addition, PTL 2 (Japanese Patent No. 5237267) proposes a configuration of an optical system having a projection optical system and an eyepiece optical system that are separated and allowing a viewer to wear a contact lens with a surface on which an HOE element is formed as the eyepiece optical system. In this configuration, although projection light from an outside is deflected by the HOE element and guided to the retina, the zero-order light component which travels straight without being deflected is present in the diffracted light of the HOE element. Because the contact lens closely adheres to a viewer's eyeball, the zero-order light component that travels straight in the HOE element certainly enters the eyeball and reaches the retina. Consequently, there is a disadvantage that the zero-order light component becomes the unwanted noise light, thereby degrading the image quality.

From the above, it is desired to develop a technique that improves image quality by reducing entry into a pupil of outside light other than projection light. The outside light other than the projection light includes zero-order light that enters an eyepiece optical system.

1. First Embodiment

1.1 Overview

An image projection system according to a first embodiment of the present disclosure has the following characteristics (1) to (3).
(Characteristic (1))
(1) An image projection system according to the first embodiment of the present disclosure includes a projection optical system and an eyepiece optical system. The projection optical system projects an image. The eyepiece optical system is configured separately from the projection optical system and is to be mounted on a head of a viewer. The eyepiece optical system includes at least one holographic element. The eyepiece optical system guides projection light from the projection optical system to a pupil of the viewer. The holographic element deflects first-order diffracted light toward the pupil (retina) of the viewer, and has a positive focal length for the first-order diffracted light. At a time of viewing of the image, the projection light enters the eyepiece optical system at an angle that is equal to or larger than θ expressed by the following expression, $$\theta = \arctan((3.5+M)/f)$$

where a focal length of the eyepiece optical system for the projection light is "f" [mm], and a maximum effective radius in an upper-lower direction with respect to the pupil of the viewer for the first-order diffracted light of the holographic element is "M" [mm].

In the image projection system according to the present embodiment, the projection optical system and the eyepiece optical system are separated from each other. The image projection system according to the present embodiment includes, for example, the projection optical system that is integrated with a light source, and the eyepiece optical system mounted on the head. The eyepiece optical system is an optical system for the viewer to view a projection image projected by the projection optical system and includes the HOE element. The HOE element deflects the projection light from a direction of the projection optical system and guides the projection light to the pupil of the viewer. In the image projection system according to the present embodiment, the projection light of the projection optical system is caused to enter the eyepiece optical system from a specific oblique direction that is off a front of the pupil, and the HOE element has maximum diffraction efficiency at a specific angle. Therefore, viewing of scenery of the front in a see-through manner is possible without being blocked by the projection optical system. Causing the projection light of the projection optical system to enter the eyepiece optical system in the oblique direction off the front of the pupil makes it possible to prevent entry of the zero-order light from traveling straight in the HOE element in the eyepiece optical system, passing through a pupil, and entering the eyeball.
(Characteristic (2))
(2) In the image projection system according to the present embodiment, the HOE element may be a volume-type HOE element.

The HOE element is roughly classified into a volume type and a surface relief type. The volume type has higher diffraction efficiency of first-order diffracted light than the surface relief type, and has a characteristic that unwanted-order light is hardly generated. The unwanted-order light becomes the noise light for an image of, for example, zero-order light other than the first-order diffracted light. Stated differently, it is possible to state that the volume type has high diffraction efficiency and is therefore able to efficiently deliver the projection light to the retina. The volume type has better wavelength selectivity and angle selectivity than the surface relief type, and has a characteristic of selectively transmitting and diffracting or reflecting and diffracting light only in a specific narrow wavelength range or a specific narrow angle range. Because this allows for selective transmission of only a certain wavelength, it becomes possible to cause the volume type to have a see-through characteristic that selectively diffracts only the projection light and transmits light of a wavelength other than the projection light such as the outside light by causing a match with the wavelength region of the light source. As an optical element for the HMD having a see-through application, the volume-type HOE element having such a characteristic is suitable.

(Characteristic (3))

(3) In the image projection system according to the present embodiment, it is desirable that the HOE element have maximum diffraction efficiency for an angle of light entering from below the eyepiece optical system, and the projection optical system be disposed below the pupil of the viewer (below the eyepiece optical system) at the time of the viewing of the image.

This prevents entry of the noise light into the pupil due to light condensing by the eyepiece optical system of the outside light from above other than the projection light. For example, the outside light from above includes outdoor sunlight and indoor illumination light from a ceiling. If the HOE element is designed to selectively diffract light having an angle from a downward direction, the outside light from above is transmitted without being condensed by the HOE element. Therefore, the degradation of the image quality due to the noise light hardly occurs.

1.2 Specific Examples

FIG. 1 illustrates a schematic configuration of an image projection system 100 according to a comparative example. FIG. 2 illustrates a schematic configuration of an image projection system 1 according to the present embodiment. It is to be noted that FIG. 1 and FIG. 2 illustrate examples in which the image projection systems 100 and 1 are used outdoors where the sun 6 is present, respectively.

The image projection system 1 according to the present embodiment includes a projection optical system 2 and an eyepiece optical system 3 that are separated from each other. The projection optical system 2 and the eyepiece optical system 3 are configured to have the above-described characteristics (1) to (3).

Although the image projection system 100 according to the comparative example also includes the projection optical system 2 and the eyepiece optical system 3, a position where the projection optical system 2 is disposed differs from that of the image projection system 1 according to the present embodiment. Hence, the image projection system 100 represents a configuration example in which the above-described characteristic (1) related to the above-described conditions of θ and the like is not satisfied. In the image projection system 100 according to the comparative example, the eyepiece optical system 3 is a refractive-type lens including a glass material or a plastic material having positive refractive power, and also has a condensing action on the sunlight other than the projection light. Consequently, the sunlight is condensed in the vicinity of a pupil 5, and becomes the noise light that enters the eyeball and reaches the retina depending on an angle of the sunlight. This degrades the image quality.

In the image projection system 1 according to the present embodiment, as illustrated in FIG. 4, for example, the eyepiece optical system 3 includes a single optical component in which an HOE element 31 of the reflection type and of the volume type is integrated with a flat-plate-shaped glass substrate 32. The HOE element 31 is adhered to one side of the flat-plate-shaped glass substrate 32. Hereinafter, an optical surface on the HOE element 31 and an optical surface on the glass substrate 32 are respectively referred to as HOE element side 3A and glass side 3B of the eyepiece optical system 3. Because of the angle selectivity of the HOE element 31 of the volume type, the HOE element 31 diffracts only light from a specific angle and reflects light from a direction off that angle without diffracting the light.

FIG. 3 illustrates angle dependency of diffraction efficiency of the HOE element 31 of the reflection type and of the volume type. Here, a wavelength λ is 542 nm and a refractive index difference "dn" of materials is 0.02. An incident angle at which the diffraction efficiency peaks is 35°. Through the use of a spherical wave that converges or diverges as object light when the HOE element 31 is exposed to light, the HOE element 31 is fabricated that has an effect of condensing light, during reproduction, to a spherical center of the spherical wave during exposure. In other words, the HOE element 31 having optical power is fabricated.

FIG. 4 illustrates an example of optical disposition of the HOE element 31 in the eyepiece optical system 3 and an action on an entering light beam in the eyepiece optical system 3. In the eyepiece optical system 3, the HOE element 31 is disposed to face entry side of an image, and the glass substrate 32 is disposed to face output side of the image. The HOE element 31 has no diffraction efficiency on light at an angle from the entry side. Therefore, the entering light first passes through the HOE element 31 without being diffracted. The light that has passed through the HOE element 31 is reflected on the glass side 3B. The light that has reflected on the glass side 3B enters the HOE element 31 again at an angle at which the diffraction efficiency peaks. At that time, the light condenses at a focal position as a result of a diffraction lens action. In this manner, in the eyepiece optical system 3, it is possible to cause the HOE element 31 to function as an HOE element of a transmission type even though the HOE element 31 is the HOE element of the reflection type. In addition, because the HOE element 31 is the HOE element having an action of a lens, it is possible to cause the projection light to enter from an angle other than a front of a viewer 4. This allows for viewing of the outside world at the front of the viewer 4. The HOE element 31 is an optical element suitable for an HMD that allows for simultaneous viewing of the projection light and the outside world in the see-through manner. Although the HOE element 31 of the reflection type is used in the present embodiment, the HOE element of the transmission type may also be used.

FIG. 5 illustrates a relationship between the zero-order diffracted light and the first-order diffracted light in the eyepiece optical system 3 of the image projection system 1 with respect to the pupil 5. Light beams of the zero-order diffracted light and the first-order diffracted light are taken into consideration on the basis of a main light beam. In the image projection system 1, the projection light enters from below the eyepiece optical system 3. Here, the angle θ at which the projection light enters is expressed by the following expression. "f" is the focal length for the first-order diffracted light of the eyepiece optical system 3. More specifically, "f" represents a composite focal length of the HOE element 31 and an optical element other than the HOE element 31 in the eyepiece optical system 3. In a case where there is no optical element having power other than the HOE element 31 in the eyepiece optical system 3 in particular, "f" is the focal length of the HOE element 31 for the first-order diffracted light. "M" is a size (radius) of the projected image in a direction parallel to an entrance plane. "M" corresponds to the maximum effective radius in the upper-lower direction for the pupil 5 of the viewer 4, with respect to the projection light in the HOE element 31. "M" corresponds to the farthest distance from an optical axis of a bundle of rays in an intersection line of a plane, which includes an optical axis prior to diffraction of the HOE element 31 and the optical axis after first-order diffraction, and a surface of the HOE element 31. Here, a maximum value of a pupil diameter is 7 [mm]. A pupil radius in this case is 3.5 [mm] which is half of the pupil diameter. From a positional relationship of the pupil 5 and the HOE element 31 in a state in which the zero-order diffracted light reaches an end of the pupil 5, a conditional expression on the angle θ of the projection light directed to preventing the zero-order diffracted light from entering the pupil 5 is derived as the following expression (1).

$$\theta = \arctan((3.5+M)/f) \quad (1)$$

In the present embodiment, f=20 [mm] and M=9 [mm]. From the aforementioned expression (1), if the projection light enters the eyepiece optical system 3 at an angle equal to or larger than θ=32°, the zero-order light traveling straight as it is does not enter the pupil 5. If the projection light is caused to enter at an incident angle of 35° at which the diffraction efficiency of the HOE element 31 peaks, an end (here, a lower end) of the zero-order diffracted light reaches upper side of an upper end of the pupil 5. Therefore, no unwanted light enters the pupil 5 and only necessary projection light (mainly, the first-order diffracted light) reaches the retina, which improves the image quality.

In a case where an optical axis coupling an output optical surface on the viewer 4 side of the eyepiece optical system 3 and the pupil 5 of the viewer 4 is "Z1", an angle of light entering the HOE element 31 is equal to the angle θ of the optical axis Z1 and the entering light beam of the projection light. In a case where the incident angle of the light that enters the HOE element 31 is equal to or smaller than θ<32°, a portion of the zero-order diffracted light having no action of a diffraction lens enters the pupil 5, thereby becoming the unwanted noise light for the image. This causes deterioration of the image quality.

In the image projection system 1 according to the present embodiment, the projection optical system 2 is disposed on front side and below the viewer 4 (below the eyepiece optical system 3). In this case, the projection light from the projection optical system 2 enters from an obliquely downward direction when viewed from the viewer 4. Consequently, in a case where the above-described condition of θ is satisfied, the zero-order diffracted light does not enter the pupil 5 of the viewer 4. In contrast, the projection light (mainly, the first-order diffracted light) diffracted by the HOE element 31 enters the pupil 5 of the viewer 4. This allows for viewing of a clear image with no noise light. No outside light not related to the image becomes the unwanted noise light and degrades the image quality.

If the HOE element 31 of the volume type is designed and manufactured to transmit and diffract only the light from the angle of the downward direction and further to have the positive focal length for the diffracted light, no outside light from above, such as sunlight, is condensed.

1.3 Effects

As described above, according to the present embodiment, the configuration of the projection optical system 2 and the configuration of the eyepiece optical system 3 are so optimized as to cause the projection light to enter the eyepiece optical system 3 at an appropriate angle. This makes it possible to reduce the unwanted light and improve the image quality. According to the present embodiment, in a display device of a head mount type having a configuration in which the projection optical system 2 and the eyepiece optical system 3 are separated, the light is prevented, which has otherwise entered the retina and caused the noise light, from reaching the retina. This makes it possible to view an image of higher quality.

It is to be noted that effects described herein are merely illustrative and non-limiting, and other effects may be provided. This similarly applies to effects of other embodiments that follow.

2. Second Embodiment

Next, description is given of an image projection system according to a second embodiment of the present disclosure. It is to be noted that, in the following, approximately the same portions as the components of the image projection system of the above-described first embodiment are denoted by the same reference numerals, and description thereof is omitted where appropriate.

2.1 Overview

The image projection system according to the second embodiment of the present disclosure further has the following characteristic (4) in addition to the characteristics of the image projection system according to the above-described first embodiment.

(Characteristic (4))

(4) In the image projection system according to the second embodiment of the present disclosure, the projection optical system includes a light source, and the HOE element has a peak of diffraction efficiency for at least one wavelength region, and a wavelength region of the light source is included in the wavelength region where the HOE element as the peak of the diffraction efficiency.

In the present embodiment, the wavelength selectivity of the HOE element is utilized. In particular, in a case where a wavelength region of the light source is caused to match a wavelength region where the diffraction efficiency of the HOE element is high, it is possible to selectively and efficiently guide only the projection light of the projection optical system to the pupil. Because spectra of the outside light such as the sunlight generally span a wide range, it is possible to cause light, which becomes the noise light, other than light in the light source wavelength of the projection optical system to be transmitted without being diffracted, while achieving a high see-through property. There are the volume-type HOE elements of the reflection type and of the transmission type, and either of them may be used. The volume-type HOE element of the reflection type, in particular, is characterized by the wavelength selectivity that is higher than the wavelength selectivity of the volume-type HOE element of the transmission type. That is, the wavelength width related to the diffraction efficiency is narrow, and therefore, there is an advantage that the see-through property or the match with the light source wavelength allows for efficient utilization of light. Reflections of more than one time in the eyepiece optical system allows even the HOE element of the reflection type to function as the optical element of the transmission type, thus making it possible to use the HOE element of the reflection type in an HMD where the light source is separated from the eyepiece optical system.

2.2 Specific Examples

A basic configuration of the image projection system according to the present embodiment may be approximately similar to the configuration of the image projection system 1 according to the above-described first embodiment. In the image projection system according to the present embodiment, however, a light source 21 and the HOE element 31 are configured as described below so as to view a color image.

FIG. 6 illustrates wavelength dependency of the diffraction efficiency of the HOE element 31 in the image projection system according to the present embodiment.

In the image projection system according to the present embodiment, an LD (Laser Diode) is used for the light source 21. A light-emitting diode (LED) may also be used in place of the LD. The light source 21 of blue (B), green (G), and red (R) is used to view the color image.

The volume-type HOE element of the reflection type is used for the HOE element 31. As illustrated in FIG. 6, peak wavelengths of the diffraction efficiency of blue, green, and red of the HOE element 31 are 445 nm, 525 nm, and 640 nm, respectively. Making a light emission peak wavelength of the light source 21 a wavelength close to the peak of the diffraction efficiency of the HOE element 31 makes it possible to efficiently deliver the projection light to the retina.

Here, consider outdoor use of the image projection system according to the present embodiment. The outdoor sunlight is the unwanted noise light for the image. If an angle property of the HOE element 31 is set to diffract only light from the downward direction, the sunlight from above simply travels straight without being condensed. That is, for the sunlight, the HOE element 31 is the same as glasses with no power, and it is not condensed to the pupil 5 to become the noise light. Furthermore, also in a case where the sunlight is reflected at a water surface or the like and enters from below the first-order light diffraction angle, only light in the wavelength range reaches the pupil 5 of the viewer 4 if the wavelength selectivity of the HOE element 31 is utilized. Hence, an amount of light becomes considerably smaller.

In the following, a specific numeric value example is illustrated. Standard spectra of AM1.5 (ASTM G173-03 Reference Spectra Deviced from SMARTS v.2.9.2) are used for entering sunlight. An amount of light $I_{out}$ of the first-order diffracted light that enters the pupil 5 after passing through the HOE element 31 is expressed by the following expression (A) where the spectra of the sunlight are Si ($\lambda$) [W*m-2*nm-1] and the efficiency of the HOE element 31 is E ($\lambda$). In addition, an amount of light $I_{in}$ of the sunlight before entering the HOE element 31 may be calculated with E ($\lambda$)=1 in the expression (A) and is expressed by the following expression (B).

[Math. 1]

$$I_{out} = \sum_{\lambda=280}^{1000} Si(\lambda) \times E(\lambda) \quad \text{(A)}$$

$$I_{in} = \sum_{\lambda=280}^{1000} Si(\lambda) \quad \text{(B)}$$

The HOE element 31 is so configured that the volume-type HOE elements for respective wavelengths of three colors of blue, green, and red are adhered together to allow for viewing of a color image. In addition, for simplicity, surface reflection and an internal transmittance of the glass substrate 32 directed to holding the HOE element 31 in the eyepiece optical system 3 are set to 0 and 1, respectively.

The blue HOE element has a center wavelength $\lambda c$ of 445 nm, a full width at half maximum FWHM of a wavelength of 20 nm, and a maximum value of transmittance of 70%. The green HOE element has a center wavelength $\lambda c$ of 525 nm, a full width at half maximum FWHM of a wavelength of 20 nm, and a maximum value of transmittance of 70%. The red HOE element has a center wavelength $\lambda c$ of 640 nm, a full width at half maximum FWHM of a wavelength of 20 nm, and a maximum value of transmittance of 70%.

In the above-described case, the amount of light of the sunlight that reaches the pupil 5 via the HOE element 31 is $I_{out}$=56.3 W/m$^2$. The amount of light of the sunlight before entering the HOE element 31 is $I_{in}$=650 W/m$^2$. A light reduction ratio resulting from passing through the eyepiece optical system 3 including the HOE element 31 is calculated as $I_{out}/I_{out}$=8.7%. Thus, utilization of the wavelength dependency of the HOE element 31 makes it possible to considerably reduce the amount of light of the sunlight.

Other configurations, actions, and effects may be approximately similar to those of the image projection system 1 according to the above-described first embodiment.

3. Third Embodiment

Next, description is given of an image projection system according to a third embodiment of the present disclosure. It is to be noted that, in the following, approximately the same portions as the components of the image projection system of the above-described first or second embodiment are denoted by the same reference numerals, and description thereof is omitted where appropriate.

3.1 Overview

The image projection system according to the third embodiment of the present disclosure further has the following characteristic (5) in addition to the characteristics of the image projection system according to the above-described first or second embodiment.
(Characteristic (5))

(5) In the image projection system according to the third embodiment of the present disclosure, the projection optical system includes a scanning mirror and an optical system disposed on back side of the scanning mirror. It is desirable that a position of an image of the scanning mirror at the time of the viewing of the image be on back side of a back-side focal position of the eyepiece optical system. The image of the scanning mirror is provided by a synthesis optical system including the optical system on the back side of the scanning mirror and the eyepiece optical system.

In the present embodiment, condensing of parallel light or approximately parallel light to an eyeball portion is avoided by causing the projection light to be condensed on back side of the back-side focal position of the eyepiece optical system. In order to guide an image from the projection optical system to the retina, it is necessary to use the HOE element having the positive focal length for the eyepiece optical system. Further, because that HOE element is so disposed as to condense light at the eyeball portion such as a cornea or a crystalline lens, light density in the eyeball portion becomes higher depending on light intensity of the outside light. Consequently, in the present embodiment, with respect to the projection light, a light condensing position of the eyepiece optical system is placed on back side in an optical axis direction of the back-side focal position of the eyepiece optical system. In contrast, in a case where the parallel light or the approximately parallel light enters the eyepiece optical system, it is possible to offset a light condensing point from the back-side focal position of the eyepiece optical system, that is, the position of the pupil, to an outside direction of the eyeball. This makes it possible to reduce light intensity density of the pupil position. This lowers the light density in the eyeball portion.

3.2 Specific Examples

FIG. 7 illustrates a schematic configuration of an image projection system 1A according to the present embodiment.

In a case where light other than the projection light enters the eyepiece optical system 3 at an angle close to the projection light, the light is subjected to the diffraction action of the HOE element 31. Hence, the main light beam is condensed at a position of the pupil 5 of the viewer 4. In the image projection system 1A according to the present embodiment, a method of lowering the light density of the light condensing in the vicinity of the pupil 5 of the viewer 4 is provided.

In the image projection system 1A, the projection optical system 2 includes the light source 21, a scanning mirror 22, and an optical system 23 on back side of the scanning mirror 22 in the projection optical system 2.

The image projection system 1A is so configured that a back-side focal position Pa of the eyepiece optical system 2 is a position on front side of the pupil 5. In the image projection system 1A, by spreading in a divergent manner a plurality of main light beams of the projection light outputted from the projection optical system 2, the main light beams are condensed on the back side of the back-side focal position Pa of the eyepiece optical system 3. FIG. 7 depicts the plurality of the main light beams of the projection light by solid lines. Meanwhile, in a case where the back-side focal position Pa of the eyepiece optical system 2 is placed at a position in the vicinity of the pupil 5, there is a possibility that, in the case of outdoor use, the sunlight is condensed by the eyepiece optical system 3 near the pupil 5 of the viewer 4, thereby adversely affecting visibility. In contrast, by placing the back-side focal position Pa of the eyepiece optical system 2 at a position on the front side of the pupil 5, the light is condensed on the front side of the pupil 5, that is, outside of the eyeball portion, even though the parallel light other than the projection light, such as the sunlight, is condensed after diffraction of the HOE element 31. Hence, it is possible to reduce the light intensity density in the vicinity of the pupil 5.

In a case where the projection optical system 2 is a projector of a laser scan type, an image is two-dimensionally scanned by the internal scanning mirror 22 and projected on a projection surface. Regarding an imaging relationship of the image, a light emitting point of laser and the projection surface are in a conjugate relationship. In contrast, regarding the imaging relationship of the pupil 5, the scanning mirror 22 and the pupil 5 are in the conjugate relationship. Paying attention to this imaging relationship of the pupil 5, imaging is in such a positional relationship that the main light beams spread from a single point of the scanning mirror 22, pass through the projection optical system 2 and the eyepiece optical system 3 thereafter, and are condensed at the pupil 5.

That is, it can be stated that the image of the scanning mirror 22 passing through the optical system 23 after the scanning mirror 22 of the projection optical system 2 and the eyepiece optical system 3 is at the position of the pupil 5. In a case where this image of the scanning mirror 22 is located on the back side of the back-side focal position Pa of the eyepiece optical system 3, the light is condensed at the back-side focal position Pa of the eyepiece optical system 3 also in a case where the approximately parallel light enters the eyepiece optical system 3 as the outside light when in use. This places the light condensing point for the outside light at a position on the front side of the eyeball, and the light becomes wider than the light condensing point in the eyeball portion. This makes it possible to lower power density. Hence, it is possible to improve the visibility.

Other configurations, actions, and effects may be approximately similar to those of the image projection system according to the above-described first or second embodiment.

4. Fourth Embodiment

Next, description is given of an image projection system according to a fourth embodiment of the present disclosure. It is to be noted that, in the following, approximately the same portions as the components of the image projection system of any one of the above-described first to third embodiments are denoted by the same reference numerals, and description thereof is omitted where appropriate.

4.1 Overview

The image projection system according to the fourth embodiment of the present disclosure further has the following characteristics (6) and (7).

(Characteristic (6))

(6) In the image projection system according to the fourth embodiment of the present disclosure, the eyepiece optical system includes a polarizer that transmits a polarization component in a specific direction and blocks a polarization component in a direction orthogonal to the specific direction.

In a case where the outside light other than the projection light enters the eyepiece optical system at an angle close to the projection light and in a case where that angle difference is in a range of the angle dependency, the light is condensed near the pupil. Consequently, the noise light increases and adversely affects the visibility. The image projection system according to the present embodiment alleviates this. In the following, description is given by means of specific examples. It has been known that, in a case where the sunlight obliquely enters a puddle on the ground, light reflected by the puddle has more light components in a horizontal direction than those in a vertical direction. In a case where the HOE element in the eyepiece optical system has the diffraction efficiency with respect to an obliquely downward direction, and the reflected light of the sunlight from the puddle enters the eyepiece optical system from the obliquely downward direction, providing the eyepiece optical system with a polarizer that transmits only light in the vertical direction makes it possible to block much of the light having components in the horizontal direction whose ratio is high in the reflected light from the puddle. In the example, although linear polarized light in the horizontal direction and the vertical direction are cited as the orthogonal polarization components, clockwise circular polarized light and anti-clockwise circular polarized light also fall within a technical scope of the present disclosure because the clockwise circular polarized light and the anti-clockwise circular polarized light are in a relationship of being orthogonal to each other.

(Characteristic (7))

(7) In the image projection system according to the fourth embodiment, it is desirable that the projection optical system output toward the eyepiece optical system light not having the polarization component in the direction orthogonal to the specific direction as the projection light.

Regarding the characteristic (6), in a case where the linear polarized light is used as the polarization component in the direction orthogonal to a specific direction, it is desirable to built-in in the eyepiece optical system a polarizer that blocks the polarization component in the horizontal direction and transmits the polarization component in the perpendicular direction. This makes it possible for the projection optical system to efficiently deliver the projection light to the retina by not having the polarization component in the horizontal direction.

4.2 Specific Examples

FIG. 8 illustrates an outline of an image projection system 1B according to the present embodiment. FIG. 9 illustrates a configuration example of the eyepiece optical system 3 in the image projection system 1B according to the present embodiment.

A basic configuration 1B of the image projection system according to the present embodiment may be approximately similar to the configuration of the image projection system 1 according to the above-described first embodiment. In the image projection system 1B according to the present embodiment, however, the eyepiece optical system 3 includes a polarizer 33 that transmits a polarization component in a specific direction and blocks a polarization component in a direction orthogonal to the specific direction, as illustrated in FIG. 9.

As illustrated in FIG. 8, for example, there is a possibility that the sunlight is reflected at a water surface 7 such as the puddle on the ground, and enters the pupil 5 of the viewer 4 through the eyepiece optical system 3 from the same direction as the projection light. FIG. 9 illustrates a method of preventing light other than the projection light from entering the pupil 5 of the viewer 4 through the eyepiece optical system 3 from the same direction as the projection light. In a case where the sunlight enters the eyepiece optical system 3 from the same direction as the projection light emitted from the projection optical system 2 after being reflected by the water surface 7 such as the puddle on the ground, the sunlight becomes the unwanted noise light for the image.

When it enters the water surface 7 at an altitude (elevation angle) of 30 degrees, the incident angle to the water surface 7 is $\alpha=60°$. In a case where a refractive index $n_1$ of air=1, the refractive index $n_2$ of water=1.333, and a refracting angle on water medium side is $\beta$, $\beta=40.52°$. In a case where polarized light vertical to the entrance plane is S-polarized light, the polarized light parallel to the entrance plane is P-polarized light, and energy reflectance (hereinafter simply referred to as "reflectance") thereof on the water surface 7 is $R_s$ and $R_p$, respectively, the reflectance is expressed by the following Fresnel expressions. It is to be noted that the entrance plane herein referrers to a plane that includes a light beam entering the water surface 7 and a light beam being reflected at the water surface 7.

$$r_p = \frac{n_2\cos\alpha - n_1\cos\beta}{n_2\cos\alpha + n_1\cos\beta} = \frac{\tan(\alpha-\beta)}{\tan(\alpha+\beta)}$$ [Math. 2]

$$r_s = \frac{n_1\cos\alpha - n_2\cos\beta}{n_1\cos\alpha + n_2\cos\beta} = -\frac{\sin(\alpha-\beta)}{\sin(\alpha+\beta)}$$

$$R_p = r_p^2$$

$$R_s = r_s^2$$

From the above-described expressions, $R_p=0.4\%$ and $R_s=11.5\%$. From this result, the reflected light from the water surface 7 has a higher ratio of the S-polarized light, that is, the polarized light in the horizontal direction. The eyepiece optical system 3 has the built-in polarizer 33 that has a function to block the polarized light in the horizontal direction and transmit the linear polarized light in the vertical direction. This makes it possible for the eyepiece optical system 3 to considerably reduce the reflected light of the unwanted light from a reflection plane that is present below the viewer 4, and to solve the above-described issue. Moreover, combined use of the wavelength selectivity of the HOE element described in the second embodiment above makes it possible to further reduce the amount of light.

Other configurations, actions, and effects may be approximately similar to those of the image projection systems according to the above-described first to third embodiments.

5. Other Embodiments

The technology according to the present disclosure is not limited to the description of each of the above-described embodiments and it is possible to make a variety of modifications to the technology.

The present technology may have the following configurations, for example.

(1)

An image projection system including:

a projection optical system that projects an image; and an eyepiece optical system that is configured separately from the projection optical system and is to be mounted on a head of a viewer, the eyepiece optical system including at least one holographic element, the eyepiece optical system guiding projection light from the projection optical system to a pupil of the viewer, in which the holographic element deflects first-order diffracted light toward the pupil of the viewer, and has a positive focal length for the first-order diffracted light, at a time of viewing of the image, the projection light enters the eyepiece optical system at an angle that is equal to or larger than θ expressed by the following expression, $$\theta=\arctan((3.5+M)/f)$$

where a focal length of the eyepiece optical system for the first-order diffracted light is "f" [mm], and a maximum effective radius in an upper-lower direction with respect to the pupil of the viewer for the projection light of the holographic element is "M" [mm].

(2)

The image projection system according to (1) described above, in which the holographic element includes a volume-type holographic element.

(3)

The image projection system according to (1) or (2) described above, in which the holographic element has maximum diffraction efficiency for an angle of light entering from below the eyepiece optical system, and the projection optical system is disposed below the eyepiece optical system at the time of the viewing of the image.

(4)

The image projection system according to any one of (1) to (3) described above, in which the projection optical system includes a light source, and the holographic element has a peak of diffraction efficiency for at least one wavelength region, and a wavelength region of the light source is included in the wavelength region where the holographic element as the peak of the diffraction efficiency.

(5)

The image projection system according to any one of (1) to (4) described above, in which the projection optical system includes a scanning mirror and an optical system disposed on back side of the scanning mirror, and a position of an image of the scanning mirror at the time of the viewing of the image is on back side of a back-side focal position of the eyepiece optical system, the image of the scanning mirror being provided by a synthesis optical system, the synthesis optical system including the optical system on the back side of the scanning mirror and the eyepiece optical system.

(6)

The image projection system according to any one of (1) to (5) described above, in which the eyepiece optical system includes a polarizer that transmits a polarization component in a specific direction and blocks a polarization component in a direction orthogonal to the specific direction.

(7)

The image projection system according to (6) described above, in which the projection optical system outputs toward the eyepiece optical system light not having the polarization component in the direction orthogonal to the specific direction as the projection light.

The present application claims the priority on the basis of Japanese Patent Application No. 2017-212859 filed on Nov. 2, 2017 with Japan Patent Office, the entire contents of which are incorporated in the present application by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. An image projection system comprising:

a projection optical system that projects an image; and an eyepiece optical system that is configured separately from the projection optical system and is to be mounted on a head of a viewer, the eyepiece optical system including at least one holographic element, the eyepiece optical system guiding projection light from the projection optical system to a pupil of the viewer, wherein the holographic element deflects first-order diffracted light toward the pupil of the viewer, and has a positive focal length for the first-order diffracted light, at a time of viewing of the image, the projection light enters the eyepiece optical system at an angle that is equal to or larger than θ expressed by the following expression, $$\theta = \arctan((3.5+M)/f)$$

where a focal length of the eyepiece optical system for the projection light is "f" [mm], and a maximum effective radius in an upper-lower direction with respect to the pupil of the viewer for the first-order diffracted light of the holographic element is "M" [mm].

2. The image projection system according to claim 1, wherein the holographic element comprises a volume-type holographic element.

3. The image projection system according to claim 1, wherein the holographic element has maximum diffraction efficiency for an angle of light entering from below the eyepiece optical system, and the projection optical system is disposed below the eyepiece optical system at the time of the viewing of the image.

4. The image projection system according to claim 1, wherein the projection optical system includes a light source, and the holographic element has a peak of diffraction efficiency for at least one wavelength region, and a wavelength region of the light source is included in the wavelength region where the holographic element has the peak of the diffraction efficiency.

5. The image projection system according to claim 1, wherein the projection optical system includes a scanning mirror and an optical system disposed on back side of the scanning mirror, and a position of an image of the scanning mirror at the time of the viewing of the image is on back side of a back-side focal position of the eyepiece optical system, the image of the scanning mirror being provided by a synthesis optical system, the synthesis optical system including the optical system on the back side of the scanning mirror and the eyepiece optical system.

6. The image projection system according to claim 1, wherein the eyepiece optical system includes a polarizer that transmits a polarization component in a specific direction and blocks a polarization component in a direction orthogonal to the specific direction.

7. The image projection system according to claim 6, wherein the projection optical system outputs toward the eyepiece optical system light not having the polarization component in the direction orthogonal to the specific direction as the projection light.

* * * * *